(12) United States Patent
Zerr et al.

(10) Patent No.: US 8,370,879 B2
(45) Date of Patent: Feb. 5, 2013

(54) CONNECTION INTERFACE FOR PERSONAL ELECTRONIC DEVICES WITH A TELEVISION

(75) Inventors: Derin M. Zerr, Sioux Falls, SD (US); Jacob M. Buckstead, Sioux Falls, SD (US); Leon P. Stoel, Sioux Falls, SD (US); David M. Bankers, Sioux Falls, SD (US)

(73) Assignee: Lodgenet Interactive Corporation, Sioux Falls, SD (US)

( * ) Notice: Subject to any disclaimer, the term of this patent is extended or adjusted under 35 U.S.C. 154(b) by 1542 days.

(21) Appl. No.: 11/709,581

(22) Filed: Feb. 22, 2007

(65) Prior Publication Data

US 2008/0209479 A1 Aug. 28, 2008

(51) Int. Cl.
*H04N 7/18* (2006.01)
(52) U.S. Cl. .............................. 725/80; 725/78; 725/83
(58) Field of Classification Search .................. 725/21, 725/142, 153, 74, 78, 80, 82
See application file for complete search history.

(56) References Cited

U.S. PATENT DOCUMENTS

| | | | |
|---|---|---|---|
| 3,922,641 A | 11/1975 | Gates, Jr. | |
| 4,821,122 A | 4/1989 | Teskey et al. | |
| 5,305,105 A | 4/1994 | Heo | |
| 5,557,300 A * | 9/1996 | Satoh | 345/170 |
| 6,133,910 A * | 10/2000 | Stinebruner | 725/49 |
| 6,622,307 B1 * | 9/2003 | Ho | 725/120 |
| 6,725,303 B1 | 4/2004 | Hoguta et al. | |
| 6,907,615 B1 * | 6/2005 | Alexander et al. | 725/80 |
| 6,953,886 B1 | 10/2005 | Looney et al. | |
| 7,089,577 B1 | 8/2006 | Rakib et al. | |
| 2002/0026635 A1 * | 2/2002 | Wheeler et al. | 725/19 |
| 2002/0174270 A1 * | 11/2002 | Stecyk et al. | 710/1 |
| 2004/0128402 A1 * | 7/2004 | Weaver et al. | 710/1 |
| 2004/0205821 A1 * | 10/2004 | Yamada et al. | 725/80 |
| 2005/0015805 A1 * | 1/2005 | Iwamura | 725/79 |
| 2005/0034160 A1 * | 2/2005 | Kim et al. | 725/80 |
| 2006/0075437 A1 * | 4/2006 | Bambic et al. | 725/80 |

* cited by examiner

*Primary Examiner* — Pankaj Kumar
*Assistant Examiner* — Timothy Newlin
(74) *Attorney, Agent, or Firm* — Kinney & Lange, P.A.

(57) ABSTRACT

A connection interface allows individuals (such as guests at a lodging facility) to use portable personal electronic devices (such as laptop computers, digital audio players, and digital audio/video players) in conjunction with a television. The connection interface device includes inputs to receive signals from various portable devices, and includes selection keys by which a guest can select a particular type of input to the television. The connection interface senses presence of video and audio signals on its inputs, and the state of the selection keys, and provides data over an in-room network with a television interface terminal. The connection interface device also routes the signals received at its inputs to corresponding inputs of the television. The television interface terminal responds to inputs from a remote control, keyboard or game controller and provides commands to the television to tune to selected channels for free-to-guest programming pay-per-view movies, video games, Internet, and other interactive services. Based on data from the connection interface, the television interface terminal can command the television to receive and play selected inputs from the connection interface.

19 Claims, 3 Drawing Sheets

CONNECTION INTERFACE FOR PERSONAL ELECTRONIC DEVICES WITH A TELEVISION

BACKGROUND OF THE INVENTION

The present invention relates to entertainment systems. In particular, the present invention is an in-room system that permits an individual to connect portable devices, such as laptop computers, digital audio players or digital audio/video players with a television.

The past two decades have seen the wide scale introduction of entertainment systems in hotels and other facilities (such as hospitals, schools, travel centers, cruise ships, etc.) to provide a variety of services to the guest through the guest room television. The services can include regular off-air television programs, pay-per-view video on demand movies, video games, Internet access, and guest services such as video shopping and video checkout.

Lodging entertainment systems include a headend which is located within the lodging facility and which is linked to guest terminals in the individual guest rooms by an MATV cable distribution system. The distribution system provides transmission of both audio/video RF signals (analog, digital or both), as well as two-way data and digital communication (typically RF) signals between the headend and guest terminals.

Typically, lodging entertainment systems are not owned by the hotel. Rather, the systems are provided by a vendor who supplies the headend equipment, and the guest room equipment (including the television, remote control, game controller, keyboard, and associated control circuitry or interface terminal which interfaces the television to the distribution system). The interface terminal may be contained in a separate set-top box, or may be on a circuit board installed within the guest room television.

Guests at lodging facilities frequently travel with electronic devices such as laptop computers, video game players, digital audio players, digital media players (like iPod, portable DVD, and MP3 players), and video recorders. In general, these guests have been unable to connect their personal electronic devices to the guest room television so they can make use of the larger screen and enhanced audio available from the guest room television. The entertainment system is usually configured to prevent guests from disconnecting or otherwise tampering with the guest room television.

Some television vendors have designed special "jack packs" to allow guests to connect personal electronic devices through the jack pack to a guest room television. An example of such a jack pack is shown in the Bambic et al. U.S. Patent Application Publication No. 2006/0075437. In general, a jack pack is designed to work only with a specific vendor's television. Control signals are provided by the jack pack to the television, and special connections and special control inputs to the television are required to interface with the jack pack. Operation of the jack pack is entirely separate from the lodging entertainment system. Thus, neither the guest nor the lodging facility obtains any benefit from the lodging entertainment system when a jack pack device is being used.

BRIEF SUMMARY OF THE INVENTION

Individuals are able to connect personal electronic devices with a television through a connection interface device which is connected through an in-room network to a television interface terminal of an entertainment system. The terminal controls operation of the television and communicates with a headend over a cable distribution system that connects the headend to the terminals and televisions. The terminal also communicates with the connection interface device over the in-room network.

The connection interface provides inputs through which personal electronic devices can be connected. The connection interface routes signals received from the personal electronic devices to audio and video inputs of the television. The connection interface includes selection buttons or keys which allow the user to select the particular input to be used by the television. The connection interface also includes signal detectors to determine which inputs are receiving an active signal.

The television interface terminal receives data from the connection interface indicating the status of the selection buttons and status of signals on the input lines to the interface. Based upon that information, the television interface terminal commands the television to tune to one of the channels provided from the headend, or to receive a selected signal from the connection interface at the audio and video inputs of the television.

DETAILED DESCRIPTION

Figure 1:
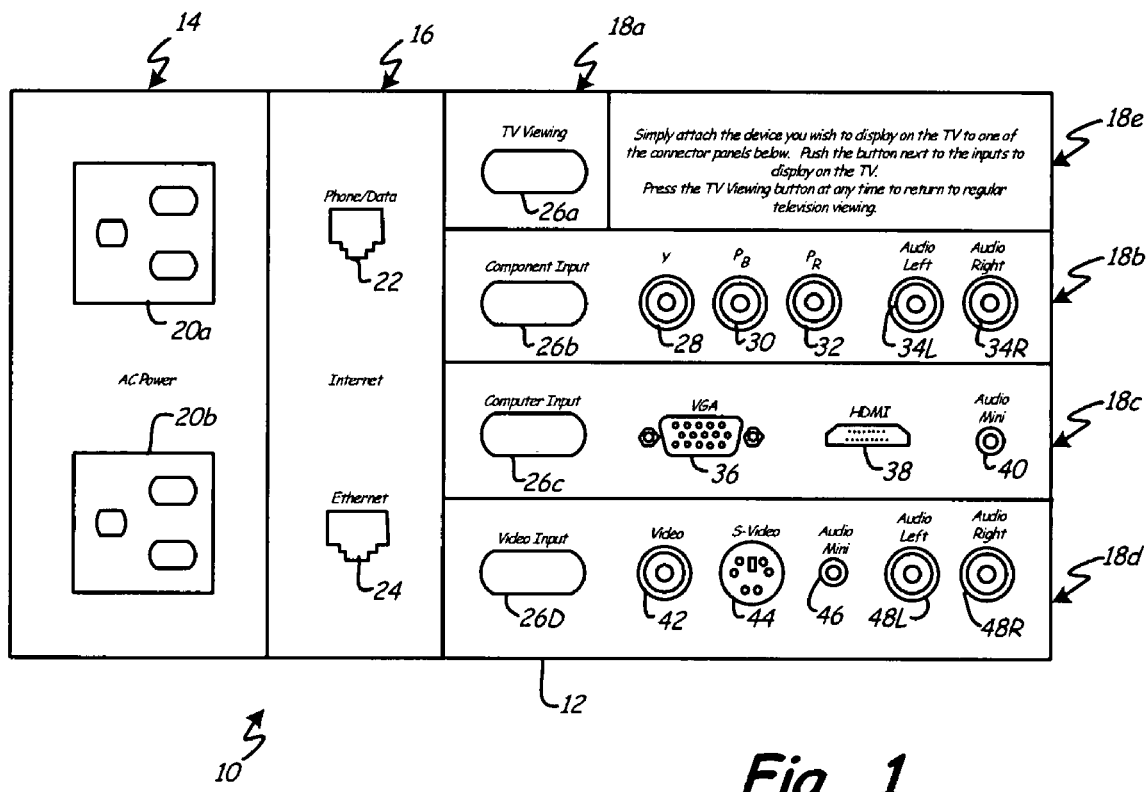
FIG. 1 is a front view of a connection interface device for use in a lodging entertainment system to allow guests to connect portable devices with a guest room television.

FIG. 1 shows a front view of connection interface 10, which is a device to enable guests in a lodging facility to easily and efficiently use portable personal electronic devices such as laptop computers, digital audio players, digital audio/video players in conjunction with a television in a guest room. Connection interface 10 can be incorporated as a panel into of a wall guest room, or into furniture. All requisite cables for connection to AC power, data/phone networks, to a guest room television, and to an in-room network are connected to the backside of connection interface 10. Front panel 12 of connection interface 10 is divided into power supply section 14, Internet connection section 16, 18a TV viewing section, and input connection sections 18b, 18c, and 18d.

Section 14 includes a pair of convenience outlets 20a and 20b for standard US alternating current (AC) power devices. Outlets 20a and 20b are oriented so that standard size AC adaptors or "wall warts" can be connected to outlets 20a and 20b at the same time.

Section 16 contains a pair of convenience jacks 22 and 24 for data connections to the Internet. Jack 22 accepts an RJ-11 connector, and is wired into a telephone system modem line. Jack 24 accepts an RJ-45 connector, and may be wired into the hotel's wired high speed Internet access network. The connection can be an Ethernet connection, or can be backed to a modem or bridge device.

The right side of front panel 12 is subdivided into four subsections: TV viewing section 18a, component input section 18b, computer input section 18c, and video input section 18d. Sections 18a-18d provide a number of different audio and video input options for a guest to connect personal electronic devices and to select different inputs to the guest room television.

TV viewing section 18a contains TV Viewing button 26a. Pressing TV Viewing button 26a at any time causes the guest room television to return to regular television viewing provided by the lodging entertainment system. This viewing may be free to guest programming, video-on-demand pay-per-view, video games, interactive services, or menuing.

Component input section 18b includes component input select button 26b, component video jacks 28, 30, and 32, audio left jack 34L, and audio right jack 34R. Computer input section 18c includes computer input selection button 26c, VGA connector 36, HDMI connector 38, and audio mini jack 40. Video input section 18d includes video input selection button 26, composite video jack 42, S-Video jack 44, audio mini jack 46, audio left jack 48L, audio right jack 48R.

Figure 2:
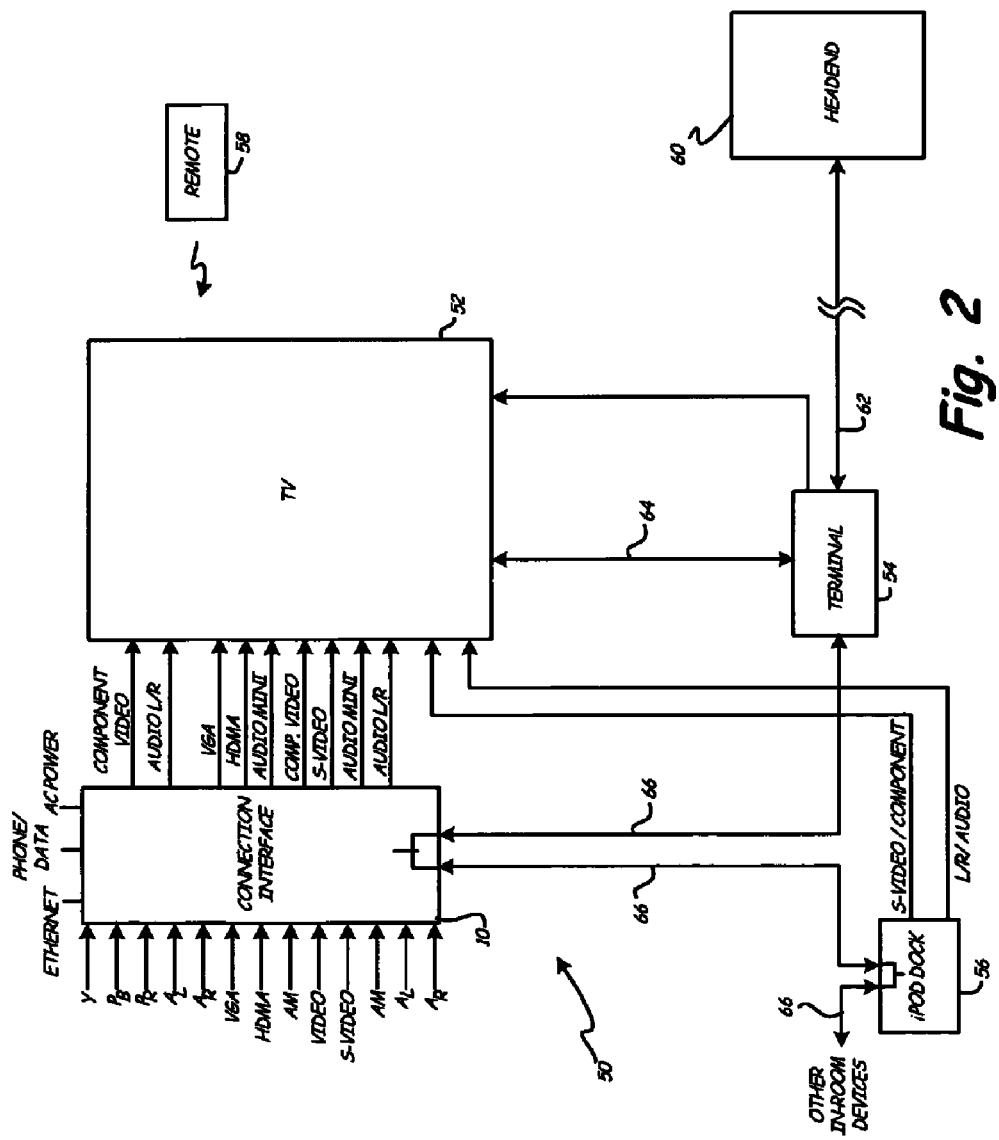
FIG. 2 is a block diagram of an in-room network for a lodging entertainment system.

FIG. 2 is a block diagram of in-room network 50 which includes interface 10, guest room television 52, television interface terminal 54, iPod dock 56, and remote control 58.

Television interface terminal 54 communicates with headend 60 over MATV cable 62. Television interface terminal 54 provides free-to-guest, pay-per-view, video games, Internet, and other interactive services to the hotel guest. In providing these services, terminal 54 works in conjunction with a computer system within headend 60 that monitors system operation, provides billing services, and distributes information for interactive services.

Television 52 is connected to cable 62 through terminal 54. When terminal 54 is not connected to television 52, or terminal 54 is not operational, television 52 reverts to normal standalone operation. In other words, television 52 will be able to tune to certain of the channels offered on cable 52 (typically the free-to-guest channels), but will not be able to access other channels that are accessible only through interaction with terminal 54. While in the standalone mode, television 52 responds to user requests provided by the TV's remote control or by input keys on the front panel of television 52.

Television 52 and terminal 54 communicate with one another through multiple television interface (MTI) 64. In one embodiment, terminal 54 and television 52 are each equipped with RJ-11C jacks that include six connector pins. The pins carry a clock signal from television 52, MTI data from terminal 54, TV data from television 52, IR data from television 52, and ground. One of the six pins is unused. The TV data is serial data supplied from television 52 to terminal 54. MTI data is serial data supplied from terminal 54 to television 52. IR data is raw infrared remote control data received by the IR sensor of TV 52. Generally, remote control 58 is a device supplied by the entertainment system vendor, rather than a device supplied by the television vendor. This allows the same remote control commands to be used with televisions from different manufacturers. Rather than requiring television 52 to be able to decode the remote control code from remote control 58, the raw IR data is passed to terminal 54, which does the decoding and determines the appropriate control commands.

Information is passed between the control system of television 52 and terminal 54 in multi byte packets. The data is passed in both directions simultaneously using separate data lines. The movement of all data is synchronized to the clock signal that is generated by television 52. Alternatively, asynchronous communication can be used.

Television 52 periodically initiates a transfer of data packets. If television 52 is currently in a standby condition, the time between packets can be relatively long (i.e. 500 milliseconds). With television 52 in an ON condition, the time between consecutive packets is shorter (i.e. a minimum of 50 milliseconds with a typical interval of about 128 milliseconds). The maximum time between consecutive packets will depend upon other ongoing tasks within the television control system. If terminal 54 is unable to respond to television 52 when requested, television 52 will continue with other tasks and will attempt to connect with terminal 54 the next time that it initiates transfer of data packets.

If no command that required action is queued, then television 52 and terminal 54 exchange status messages/commands. Once terminal 54 has been identified, terminal 54 is essentially in charge of the control of television 52. Most user inputs received by television 52 are transformed into commands and passed to terminal 54. Terminal 54 then receives and identifies the command. Terminal 54 has the option of transmitting back to television 52 at the next polling interval, the terminal-to-television command that will properly control television 52.

Operation of television 52 and terminal 54 has one of two states: online or standalone. If television 52 has established communication with terminal 54 and has not lost ten consecutive messages, television 52 is in the online state. When in the online state, television 52 is considered to be a slave to terminal 54. Television 52 will perform the control functions as commanded by terminal 54. If communications with terminal 54 have not been established, or ten consecutive polling sequences have failed, television 52 will revert to standalone operation.

Television 52 maintains, within nonvolatile memory, a channel memory map that identifies those channels that are permitted when in standalone mode. If communication with terminal 54 is lost, television 52 reverts to the standalone mode and checks the channel memory map to determine whether the currently tuned channel is a valid channel. If the channel is invalid, television 52 will tune to the lowest channel number saved in the channel memory map.

The format of information sent from television 52 to terminal 54 is in the form of commands. These commands include TV Status, Power ON/OFF, Volume Control, Channel/Program Scan, Report Currently Tuned Digital Channel, and Television Error.

TV Status informs terminal 54 of the present status of television 52. This includes identification of whether the power is on to television 52 and which channel or auxiliary input is currently being used by television 52. The channels are supplied over cable 62 from headend 60. The auxiliary inputs are those received from connection interface 10 and from iPod dock 56, and include both audio and video inputs.

Power ON/OFF is used to inform terminal 54 that a request to bring television 52 into or out of a standby mode has been received from the guest. The command can also include bytes that indicate the source of the request (such as whether it is from remote control 58, from the local keyboard on television 52, or from another source).

Volume Control informs terminal 54 that a request has been received to modify the value of the television volume control. The volume control command can be volume up, volume down, or mute.

Channel/Program Scan informs terminal 54 that a request has been received to modify the current television channel or program. The command can indicate the source of the request. It also indicates whether the command is channel up or channel down.

Report Currently Tuned Digital Channel is a response to a command received from terminal 54. This command reports the currently tuned digital channel.

Television Error informs terminal 54 that an error has been detected by the control system of television 52. The error may either be an internal problem with the television receiver, or a problem with the last communication packet received from terminal 54.

Terminal 54 provides commands to television 52 over MTI 64. These commands include MTI Terminal Status, Power ON, Power OFF, Tune Channel/Display Number, Force Volume Level, Erase Channel Memory, Add Channel, Delete Channel, Remote Format In, Tune Digital Channel, Request Currently Tuned Digital Channel, and Set Auxiliary Input.

MTI Terminal Status informs television 52 of the current status of terminal 54. In the absence of any other specific command, terminal 54 will send this information to television 52 after it receives a TV Status command from television 52.

Power ON is used by terminal 54 to request that television 52 enter a Power ON mode. Similarly, a Power OFF requests that television 52 enter a Standby mode.

Tune Channel/Display Number command is used to request television 52 to tune to a channel or update the current display number. The channel number and the display number are independent.

Forced Volume Level is used to request television 52 to force the volume level to a specified value.

Erase Channel Memory, Add Channel, and Delete Channel commands are used to force television 52 to change the contents of the internal nonvolatile channel memory. The command may force television 52 to erase the memory, to add a specified channel, or to set a specified channel to skip within the internal nonvolatile channel memory.

Remote Format In is used to allow terminal 54 to send television 52 a command that is interpreted as though a remote key had been pressed.

Tune Digital Channel and Request Currently Tuned Digital Channel are commands used with televisions having digital television capability. Tune Digital Channel is used to force television 52 to tune to a physical RF channel and to decode a particular MPEG stream within that channel. If there is no MPEG stream available, then television 52 will simply display an onscreen display indication of no signal.

Request Currently Tuned Digital Channel is used by terminal 54 to request the identification of digital channel to which television 52 is tuned. If television 52 has digital TV tuning capabilities, it will correspond with a Report Currently Tuned Digital Channel command. If the television 52 does not have digital TV capabilities, it will ignore the command.

Set Auxiliary Input command is used to change the input to television 52. The auxiliary inputs are audio and video inputs received from connection interface 10 and from iPod 56.

The Set Auxiliary Input command includes identification of which type of input source should be used by television 52. In the embodiment shown in FIG. 2, these input sources include the internal tuner of television 52 (which receives programming from MATV 62), composite video/audio from connection interface 10, S-video and audio from either connection interface 10 or iPod dock 56, component video and audio from either connection interface 10 or iPod dock 56, VGA/RGB video and audio from connection interface 10, and HDMI video and audio from connection interface 10.

Because there can be multiple sources of the same type available, the Set Auxiliary Input command includes data bytes that identify which of the multiple sources of the same type should be selected.

Terminal 54 interacts with connection interface 10, iPod dock 56, and other in-room devices (such as other media dock devices and thermostats or other environment control devices). Terminal 54, connection interface 10, iPod dock 56, and other in-room devices are connected over bus 66. In one embodiment, bus 66 is an RS232 bus with devices connected in a daisy chain topology as shown in FIG. 2. In this embodiment, half duplex RS232 signals are exchanged over bus 64. Terminal 54 acts as the bus master, and all in-room devices act as bus slaves.

RS232 bus 64 includes three unidirectional signal connections defined as Terminal Data, Device Data, and Signal Ground. Device Data represents serial data transmitted from a room device to terminal 54. Terminal Data is serial data being sent from terminal 54 to one of the in-room devices.

Each slave device on bus 66 loops the incoming RS232 signals both up and down the daisy chain. All devices are capable of listening to the commands from terminal 54. When a slave needs to respond, it switches the return device data path from downstream devices to high impedance and enables its own transmit data line. Upon completion of the response, the device places its transmitter into high impedance so as not to contend with other device responses.

Figure 3:
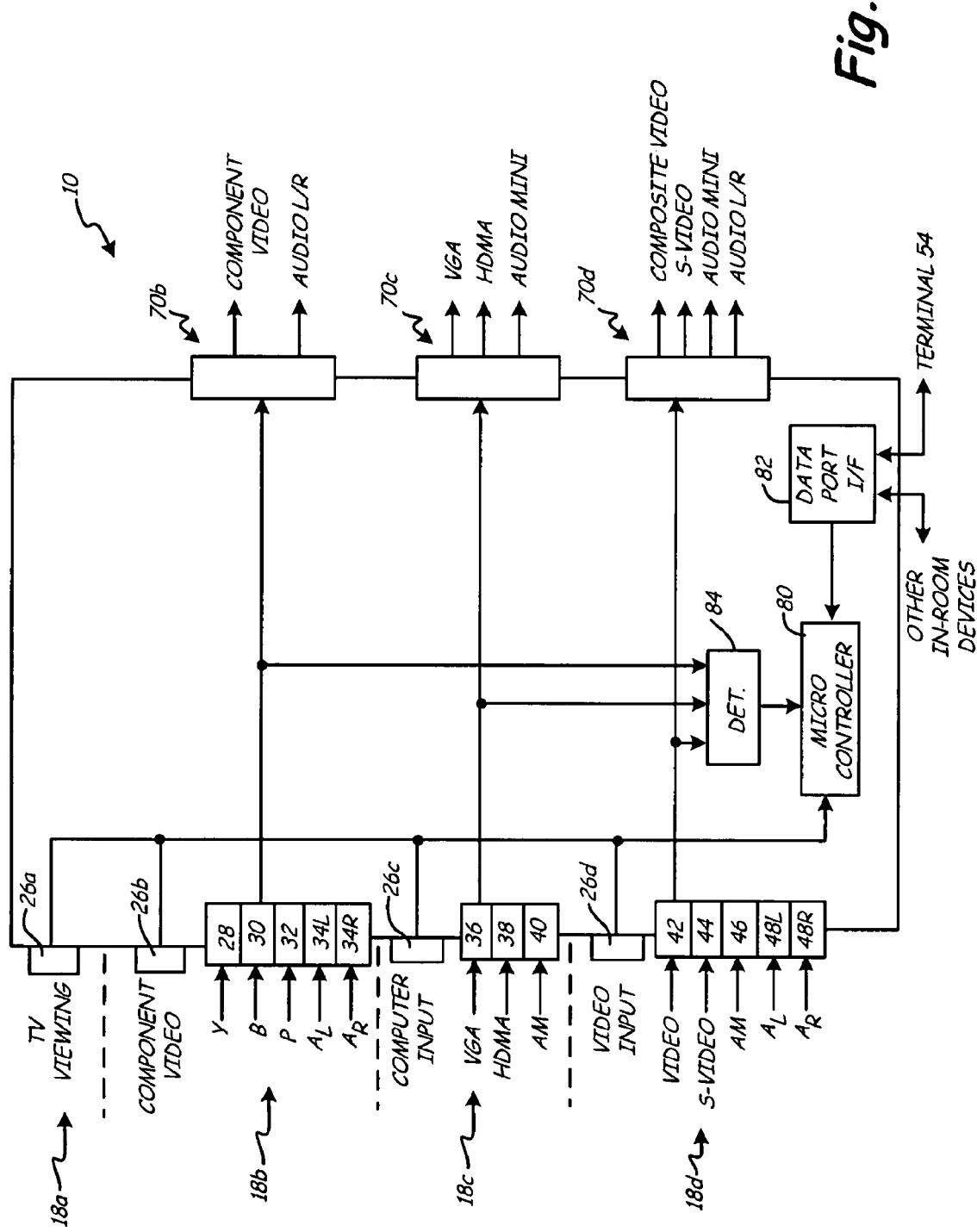
FIG. 3 is a block diagram of the connection interface device of FIG. 1.

FIG. 3 is a block diagram of connection interface 10. In FIG. 3 video and audio inputs and outputs of connection interface 10 are shown. The inputs include Y, $P_B$ and $P_R$ video input jacks 28, 30, and 32, audio left and right jacks 34L and 34R of Component Input section 18b; VGA connector 36, HDMI connector 38 and audio mini jack 40 of Computer Input Section 18c; and composite video connector 42, S-Video connector 44, audio mini jack 46, and audio left and right jacks 48L and 48R of Video Input Section 18d.

Outputs 70b are connected to the inputs of section 18b and provide component Video and Audio L/R signals to television 52. Outputs 70c are connected to the inputs of section 18c and provide VGA, HDMA and Audio Mini signals to television 52. Outputs 70d are connected to the inputs of section 18d and provide Composite Video S-Video, Audio Mini, and Audio L/R signals to television 52.

Connection interface 10 includes micro-controller 80, data port interface 82, and detection circuitry 84. Micro-controller 80 communicates with terminal 54 via data port interface 82. Micro-controller 80 reads the status of selection buttons 26a-26d for user selections.

Detection circuitry 84 is used to determine if an input device is connected to one of the input ports and is providing an active input signal. The status of each input port is reported to micro controller 80. Terminal 54 polls connection interface 10 via data port interface 82 for the status of selection buttons 26a-26d and for the status of the detection of video and audio inputs by detection circuitry 84.

Terminal 54 polls connection interface 10 on a periodic basis. The polling is in the form of a status poll command and may occur at a time interval of about 200 to about 500 milliseconds. The status poll command checks to see if the status of any of the user inputs to connection interface 10 (e.g. the status of one of the buttons or status of one of the detection circuits) has changed. Connection interface 10 responds with an acknowledge message if nothing has changed. If the status of the user input has changed, the response will identify what input has changed status.

In response to actuation of one of the input selection buttons, terminal 54 can instruct television 52 to change to a corresponding input. Terminal 54 may also demand a switch of inputs by television 52 on the detection of an active input signal by one of detection circuits 84.

Where more than one input is associated with a single selection button (i.e., VGA connector 36 and HDMI connector 38 with Computer Input selection button 26c), terminal 54 may detect a selection button and then poll data port interface 82 for information on active inputs. This allows terminal 54 to determine which of the inputs is actually being used by the guest.

If a user presses Computer Input selection button 26c, and neither VGA connector 36 nor HDMI connector 38 is detected as active, terminal 54 may select one of the inputs as a default selection. Since the most common devices carried by travelers at present have a VGA output, VGA connector 36 may be a good choice for the default selection.

Connection interface 10 offers two distinctly different ways that the physical interface with the guest can operate. They are Manual Button Press mode and Auto-Sensing with Auto-Switching mode.

In Manual Button Press mode, the guest must press a corresponding button to the input in order to switch sources to television 52. For example, if the guest connects a device to S-Video connector 44 in video input section 18d, the guest must then press Video Input button 26d to select the S-Video output from connection interface 10 as an input to television 52. Because there are two possible sources of video signals from Video Input section 18d, the status of detection circuitry 84 can be checked by terminal 54 through data port interface 82 in order to determine whether the S-Video input or the Composite Video Input to television 52 should be selected.

In order to switch back to the tuner of television 52, and therefore the signals being received over MATV cable 62, the guest may press TV selection button 26a, or press channel up, channel down or numerical input buttons on remote control 58, or turn off television 52 and then turn it back on. When television 52 is turned off and then powered back on, it will default back to the TV tuner, and to the welcome channel provided from headend 60 over cable 62.

If picture-in-picture (PIP) functionality is supported in television 52, an additional "PIP button" may be added to connection interface 10. The PIP button can be used to allow the guest to enable picture-in-picture functionality, and to toggle between two different inputs to television 52. Those two inputs could be two different inputs supplied by connection interface 10, or could be inputs from connection interface 10 and another device (i.e. the television tuner or iPod dock 56).

In the Auto-Sensing with Auto-Switching mode, whenever an active signal (i.e. a guest device) is connected to one of the inputs, is powered on, and is sending a video or audio signal detection circuitry 84, connection interface 10 provides that information to terminal 74 through data port interface 82. Terminal 54 then commands television 52 to switch to that active input. Select buttons 26a-26d are used in this mode to provide an override function. Alternatively, the buttons can be used to confirm that the user wants to select that input in response to a message displayed on the screen of television 52.

Graphical or textural feedback may be provided to the guest via the TV screen, and to confirm the input was sensed and that the source is being switched. For example, terminal 54 reports status of input selection to headend 60. In response to data indicating that an input has been sensed and that a command to switch inputs will be given to television 52, headend 60 can first generate an onscreen message. Terminal 54 provides a command to television 52 to first change to a channel on which the onscreen message appears. As part of the onscreen message, the guest may be prompted to use one of the manual buttons 26a-26d of connection interface 10 either to override the automatic switching of inputs, or to confirm that the switching should take place.

If one of the inputs to connection interface 10 has an active signal already present, and another input starts to receive an active signal, connection interface 10 will report the status of both inputs to terminal 54 through data port interface 82. In the Auto-Sensing with Auto-Switching mode, terminal 54 will then command television 52 to automatically switch to the second input with the more recently detected active signal. Confirmation of the switching can once again be provided through an onscreen display.

As with the Manual Button Press mode, the Auto-Sensing with Auto-Switching mode can operate with picture-in-picture functionality on television 52. Whenever an active signal is sensed by connection interface 10, a confirmation menu will appear on screen that asks the guest if he or she wants to see a split screen interface, where the default television source (i.e. free to guests or pay-per-view television) is on part of the screen, and the other part of the screen has the video or audio from the active input of connection interface 10. This confirmation menu is generated at headend 60 in response to data sent by terminal 54. The guest then has an option to choose either split screen or full screen for the video input from connection interface 10. Confirmation can be provided either using the buttons of connection interface 10, or using remote control 58. In either case, the response of the guest will be routed to terminal 54, which will determine what should be provided on screen. Terminal 54 then provides the appropriate command or commands to television 52. Where picture-in-picture functionality is available, a choice can be provided to the guest when a second active signal is detected by connection interface 10. Terminal 54 and headend 60 interact to generate a menu asking the guest whether a split screen is desired. In this case, the split could be between the television source, the first active input, or the second active input. The guest is then given the opportunity to provide confirmation in response to the menu either by pressing buttons on connection interface 10, or by providing an input using remote control 58.

When an audio only input is plugged into connection interface 10 where picture-in-picture functionality is available, terminal 54 can command television 52 to play the audio through the television speakers or sound system while keeping the video that was on screen at the time still visible.

Switching back to the TV tuner can be accomplished in a number of different ways. Once the guest disconnects all portable devices from connection interface 10, or shuts all of the devices off, there will be no active signal detected be detection circuitry 84. The change of status will be reported to terminal 54, which then generates a command to television 52 to switch back to the main television tuner.

The in-room network that includes connection interface 10 and terminal 54 provides a number of advantages. First, because connection interface 10 communicates with terminal 54 rather than directly with television 52, it does not require that television 52 have a special set of control inputs for use by connection interface 10. As a result, connection interface 10 can be used with multiple makes and models of television, in contrast to currently available "jack packs".

Second, the in-room network allows interactive menus produced by headend 60 to provide instructions and obtain guest feedback. This helps make use of the connection interface easier for the guests.

Third, the in-room network provides the ability to log and report usage of connection interface 10. Terminal 54 monitors the status of connection interface 10 on a continuing basis, and reports the status to headend 60. As a result, it is possible to obtain data on the extent of use and the time of use of connection interface 10. This may provide helpful insights to the management of the lodging facility, as well as to the lodging entertainment system vendor in order to improve the overall guest experience.

Fourth, the in-room network also provides the ability to remotely monitor and support connection interface 10. This ability is provided due to the continuing polling of the status of connection interface 10 by terminal 54, and the reporting of status by terminal 54 to headend 60.

Fifth, the connection of the in-room network to headend 60 allows the opportunity to remotely load new software to connection interface 10. This avoids requiring service personnel to visit the site and to make up grades in every guest room.

Sixth, because connection interface 10 is a part of an in-room network together with other parts of the lodging entertainment system, it can be installed and maintained as part of the lodging entertainment system, rather than being installed and maintained separately. As a result, cost efficiencies are achieved.

Seventh, in some configurations, connection interface 10 can also house television interface terminal 54.

Although the present invention has been described with reference to preferred embodiments, workers skilled in the art will recognize that changes may be made in form and detail without departing from the spirit and scope of the invention.

The invention claimed is:

1. An entertainment system comprising:
a headend;
a television;
a remote control for transmitting remote control signals to the television;
a distribution system for distributing media content from the headend to the television; and
a network including:
a connection interface including a plurality of inputs for receiving outputs of personal electronic devices, a plurality of selection buttons, detection circuitry for detecting active signals at the plurality of inputs, and a plurality of outputs for delivering signals received at the plurality of outputs to inputs of the television; and
an interface terminal that communicates over a first digital bus with the connection interface to monitor status, that communicates with the headend over the distribution system, and that communicates with the television over a second digital bus to receive information relating to status of the television and remote control data based on remote control signals received by the television and to send information to the television to control operation of the television, the information sent to the television including commands to the television to cause the television to select signals from the connection interface based upon status of the selection buttons and detection of active signals by the detection circuitry, and commands to the television to control tuning of the television to media content from the headend.

2. The system of claim 1, wherein the interface terminal causes the headend to provide an onscreen message to be displayed on the television in response to detection of an active signal at one of the inputs to the connection interface.

3. The system of claim 1, wherein the interface terminal commands the television to select a signal from the connection interface based upon whether one of the selection buttons is actuated in response to the onscreen message.

4. The system of claim 1, wherein the interface terminal provides data to the headend relating to usage of the connection interface.

5. The system of claim 1, wherein the interface terminal commands the television to select an input in response to a change of state of one of the selection buttons.

6. The system of claim 1, wherein the interface terminal commands the television to select an input in response to detection of an active signal by the detection circuitry.

7. The system of claim 1, wherein the interface terminal commands the television to select an input if both a select button is actuated and an active signal is detected on an input to the connection interface that is related to the select button.

8. The system of claim 1, wherein the interface terminal periodically polls the connection interface for data indicating status of the selection buttons and detection of active signals.

9. The system of claim 1, wherein the interface terminal reports the status of the selection buttons and detection of active signals to the headend.

10. The system of claim 1, wherein the interface terminal and the connection interface communicate over a digital communication bus.

11. The system of claim 1, wherein the selection buttons include at least one of a TV Viewing button, a Component Input button, a Computer Input button, and a Video Input button.

12. The system of claim 1, wherein the interface terminal monitors and reports usage of the connection interface to the headend.

13. The system of claim 1, wherein the interface terminal communicates with the television through a multiple television interface.

14. A method of connecting personal electronic devices to a television, the method comprising:
mounting a connection interface in a room, the connection interface including a plurality of inputs, a plurality of outputs, a plurality of selection buttons, and detection circuitry for detecting presence of active signals at the plurality of inputs;
connecting the outputs of the connection interface to inputs of the television;
communicating status of the selection buttons and whether an active signal is present at one of the plurality of inputs from the connection interface to an interface terminal over a first digital bus; and
sending commands from the interface terminal to the television over a second digital bus commanding the television to select one of its inputs based upon status of the selection buttons and whether an active signal is present at one of the plurality of inputs to the connection interface.

15. The method of claim 14 and further comprising:
periodically polling the connection interface by the interface terminal for status of the selection buttons and presence of active signals.

16. The method of claim 14 and further comprising:
causing an onscreen message to be displayed on the television in response to detection of presence of an active signal.

17. The method of claim 16 and further comprising:
sending commands from the interface terminal to the television commanding the television to select an input corresponding to the active signal whose presence has been sensed.

18. The method of claim 16 and further comprising:
inhibiting selection of an input from the connection interface if a selection button is actuated in response to the onscreen message.

19. The method of claim 14, wherein a default selection of an input is made if no active signal is present.

* * * * *